United States Patent [19]
Lindner et al.

[11] Patent Number: 5,651,186
[45] Date of Patent: Jul. 29, 1997

[54] LIQUID LEVEL VIAL AND METHOD FOR MAKING THE VIAL

[75] Inventors: Thomas A. Lindner, West Bend; Joseph B. Coel, Waterford, both of Wis.

[73] Assignee: Empire Level Mfg. Corp., Milwaukee, Wis.

[21] Appl. No.: 513,158

[22] Filed: Aug. 9, 1995

[51] Int. Cl.[6] .................... G01C 9/34; G01C 9/02
[52] U.S. Cl. ...................................... 33/377; 33/365
[58] Field of Search .................... 33/377, 365, 379, 33/381, 382

[56] References Cited

U.S. PATENT DOCUMENTS

| | | | |
|---|---|---|---|
| 2,752,693 | 7/1956 | Wullschleger | 33/379 |
| 3,028,290 | 4/1962 | Roberts et al. | 156/143 |
| 3,593,428 | 7/1971 | Jacoff | 33/379 |
| 3,842,514 | 10/1974 | Scheyer | 33/379 |
| 3,871,109 | 3/1975 | Vaida | 33/379 |
| 4,347,088 | 8/1982 | Jacquet | 156/69 |
| 4,456,576 | 6/1984 | Cotte | 264/255 |
| 4,521,974 | 6/1985 | Neis et al. | 33/379 |
| 4,988,472 | 1/1991 | Orimoto et al. | 264/273 |

*Primary Examiner*—Christopher W. Fulton
*Attorney, Agent, or Firm*—Jansson & Shupe, Ltd.

[57] ABSTRACT

A vial for a builder's level includes a body with an interior wall and a body cavity containing a bubble. A marker ring is exposed in the cavity. In the improvement, the ring is embedded in the body and the interior wall and the ring have surfaces machined and coextensive with one another. The bubble moves smoothly across the machined wall and ring surfaces. A new method for making a level vial includes providing an intermediate vial product with a body wall having at least one marker ring embedded in it and machining the wall and the ring to form a wall surface free of discontinuities. The intermediate vial product is also disclosed.

20 Claims, 4 Drawing Sheets

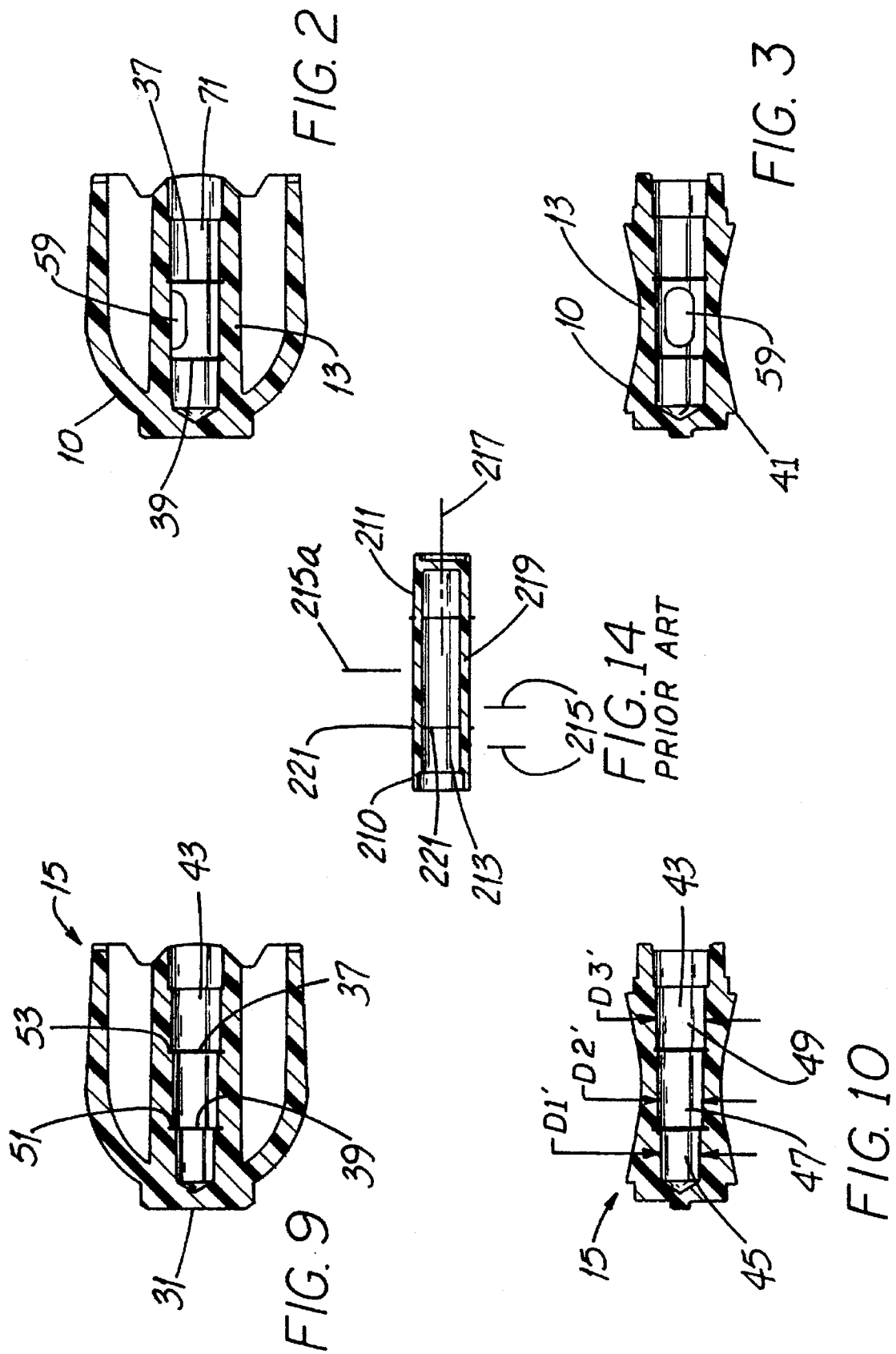

LIQUID LEVEL VIAL AND METHOD FOR MAKING THE VIAL

FIELD OF THE INVENTION

This invention relates to geometric instruments and, more particularly, to levels (sometimes referred to as "spirit levels" used by carpenters and the like.

BACKGROUND OF THE INVENTION

Levels are used by carpenters, masons, drywallers and the like for helping to assure that surfaces are horizontal or (notwithstanding their name) vertical, as the case may be. A typical level includes at least two vials, one each for ascertaining whether a surface is "level," i.e., horizontal, or "plumb," i.e., vertical.

A level vial comprises a tube made of clear glass or, preferably, clear plastic (acrylic, for example), the barrel-shaped cavity of which is partially filled with a liquid such as mineral spirits colored with a fluorescent dye. The vial is not completely filled and a bubble is thereby formed when the vial is closed. Two marker rings are applied to the outside of the vial in positions to visually divide the cavity into three portions of about equal length. Level and plumb conditions are ascertained by noting the position of the bubble with respect to the marker rings.

A problem with molding substantially-finished vials is that acrylic, the material predominantly used for making molded vials, does not stretch well. If one attempts manufacture of an acrylic vial which has thick walls (for breakage resistance), the stretch-resisting characteristic of acrylic causes breakage of core pins used in the injection molding process. On the other hand, a thin-wall vial is much more subject to breakage—builder's levels often receive rough treatment in use.

One approach (which seemingly could be used to make a thick-wall vial) is described in U.S. Pat. No. 4,347,088 (Jacquet). A barrel-shaped inner cavity is machined in a preform. Inner grooves are also machined to receive what the patent calls "reference segments" or "circlips," i.e., C-shaped rings generally like common snap rings. Of course, such rings necessarily have a discontinuity or opening about the perimeter so that the ring can be compressed radially for insertion into the cavity.

A ring is seated in each of two respective grooves and the grooves are stated to have a "semi-trapezoidal" section. It is believed that such phrase refers to a chamfer formed along one side of the groove to permit a circlip to seat fully in the groove bottom.

A problem with such construction is that the surface "transition" between a circlip and the inner wall of the tube will not be smooth, at least because of the existence of a small annular space (at the chamfer) between the circlip and the wall. In other words, a slight edge will be presented to a bubble moving along the vial and such edge may cause the bubble to "hang up" in its travel and yield an inaccurate reading.

And there may be another reason why the circlip/wall transition may not be smooth. Circlips are made to a manufacturing specification involving dimensional tolerances and their thickness, measured radially, will vary (however minutely) from clip to clip. Even with grooves that are always at exactly the same depth from tube to tube (and as a practical matter, that is a manufacturing impossibility), clips of varying radial thickness will be (a) precisely "flush" with the tube wall as desired, (b) protrude slightly beyond such wall, or (c) be slightly depressed in such wall. Either of the latter two events will also present a slight edge to a bubble moving along the vial. And in any event, the chamfer-related edge always exists to impede bubble travel.

Another problem (albeit not necessarily a major one) with known level vials involves the exteriorly-applied marker rings. Since such rings are at least somewhat exposed to contact by foreign objects, portions of such rings can be worn or chipped away over time.

An improved level vial which has a sturdy, breakage-resistant wall, which permits the vial bubble to move smoothly and freely along such wall and which is free of ring discontinuities would be an important advance in the art. Similarly, an intermediate product and a method for making such a vial would be important advances.

OBJECTS OF THE INVENTION

It is an object of the invention to provide an improved level vial overcoming some of the problems and shortcomings of the prior art.

Another object of the invention is to provide a level vial which has improved resistance to breakage.

Another object of the invention is to provide an improved level vial permitting unimpeded movement of the vial bubble.

Still another object of the invention is to provide an improved level vial having marker rings free of ring discontinuities.

Another object of the invention is to provide a level vial having marker rings protected from contact by foreign objects.

Another object of the invention is to provide a vial made of a clear thermoplastic and which has relatively-thick walls and yet substantially avoids core pin breakage during manufacture.

Yet another object of the invention is to provide an intermediate vial product for making the new vial.

Another object of the invention is to provide an intermediate vial product which can be readily machined to a completed vial.

Still another object of the invention is to provide a new method for making the new level vial.

Another object of the invention is to provide a new method which results in a vial wall and ring surface which are smooth and coextensive. How these and other objects are accomplished will become apparent from the following descriptions and from the drawings.

SUMMARY OF THE INVENTION

The invention involves a level vial including (a) a body with an interior wall defining a body cavity, (b) a marker ring exposed in the cavity, and (c) a bubble in the cavity. In the improvement, the interior wall and the marker ring each have a machined, slightly-curvilinear surface and the surfaces are coextensive with one another. There are no significant grooves or edges on which the vial bubble might otherwise "hang up"—such bubble moves smoothly across the machined surfaces.

The marker ring and the plastic body are bonded to one another, the body is molded of plastic (preferably a clear thermoplastic such as acrylic) and there is a vial end closure portion integrally molded with the body. And the marker ring has an outer perimeter surface which is spaced radially outward from the interior wall and is free of discontinuities. To put it in other terms, the ring circumscribes an area, e.g., a circle.

Another aspect of the invention involves an intermediate product for making a level vial. Such product has first and second cavity portions having, respectively, first and second radially-measured dimensions. Preferably, such portions are cylindrical and the dimensions are diameters.

In one specific embodiment, the second dimension is greater than the first dimension. In another specific embodiment, the product has a third cavity portion with a third dimension greater than either the first dimension or the second dimension. In a highly preferred embodiment, the cavity portions are generally cylindrical and circular in cross-section and the dimensions are diameters.

The first and second cavity portions abut at a first boundary and the product includes a first marker ring at the boundary. Similarly, the third cavity portion and the second cavity portion abut at a second boundary and the product includes a second marker ring at the second boundary. As with the finished vial, the intermediate product has an end closure portion integrally molded with the body.

Another aspect of the invention involves a new method for making a level vial. The method includes providing an intermediate vial product with a body wall having at least one marker ring embedded therein and machining the wall and the ring to form a wall surface that is substantially smooth and free of discontinuities. The bubble in the vial is thereby free to move smoothly along the wall and back and forth across the ring.

In more specific aspects, the providing step includes supporting the marker ring within a mold by mounting the marker ring on a pin and then filling the mold with hot plastic material. After filling the mold, the plastic material is permitted to cool so that such material and the marker ring bond to one another for subsequent machining.

The machining step includes providing a cutting tool and relatively rotating the intermediate vial product and the cutting tool with respect to one another. Most preferably, the intermediate vial product is held stationary and the cutting tool is rotated with respect to such vial product.

More specifically, the cutting tool is rotated about an axis of rotation and is also moved away from the central long axis of the intermediate product, i.e., is moved radially outward. Most preferably, a pointed tool (a type of boring bar) is used for machining and the moving step also includes moving the cutting tool along the interior cavity of the intermediate product. And as molded, the intermediate product includes an end closure portion integrally molded with it.

Further details of the invention are set forth in the following detailed description and in the drawings.

BRIEF DESCRIPTION OF THE DRAWINGS

FIG. 2 is a cross-sectional view of the new vial taken generally along the viewing plane 2—2 of FIG. 1.

FIG. 3 is a cross-sectional view of the new vial taken generally along the viewing plane 3—3 of FIG. 1.

FIG. 9 is a cross-sectional view of the intermediate vial product taken generally along the viewing plane 9—9 of FIG. 12.

FIG. 10 is a cross-sectional view of the intermediate vial product taken generally along the viewing plane 10—10 of FIG. 11.

FIG. 14 is a section view of a prior art thin-wall vial.

DETAILED DESCRIPTION OF PREFERRED EMBODIMENTS

Figure 1:
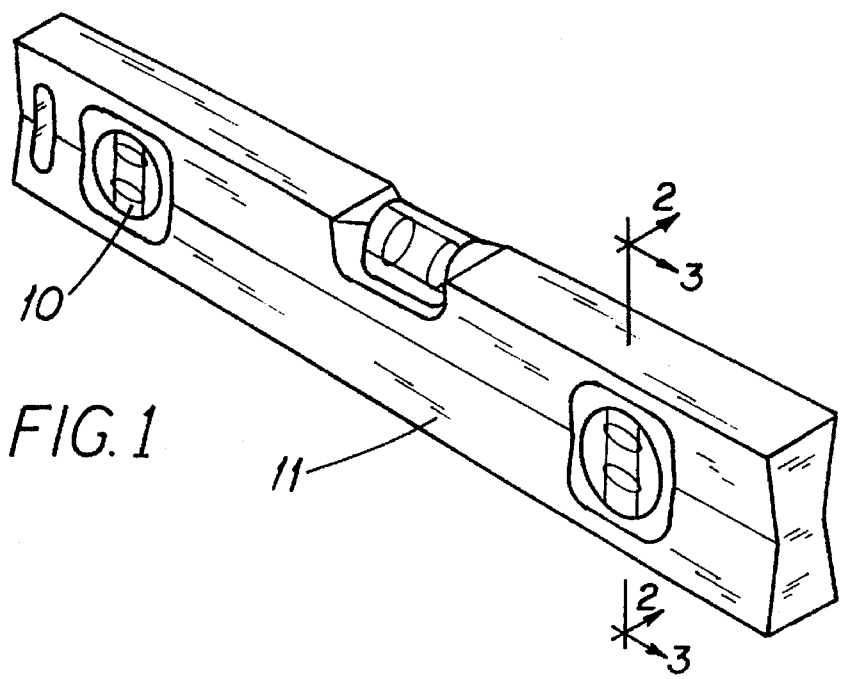
FIG. 1 is a perspective view of an exemplary builder's level incorporating the new vial.
Figure 11:
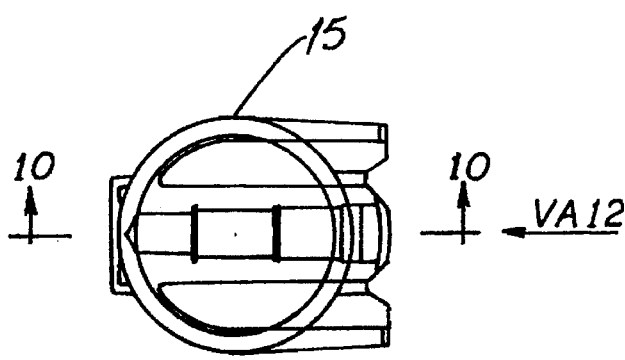
FIG. 11 is a side elevation view of the intermediate vial product.
Figure 12:
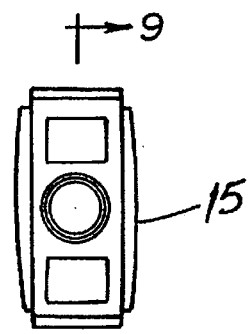
FIG. 12 is an end elevation view of the intermediate vial product of FIG. 11 taken generally along the viewing axis VA 12 thereof.

Before describing the new level vial 10, it will be helpful to have an understanding of some aspects of a conventional thin-wall vial and of a builder's level of the type having level vials. Referring to FIG. 14, the prior art vial 210 has a molded thin-wall acrylic body 211, the inside cavity 213 of which is slightly barrel-shaped. That is, such cavity 213 has a circular cross-section at any plane 215 normal to the body long axis 217. The circle radius is greatest at the center plane 215a. Because the body 211 has a thin wall 219, it is able to stretch over a barrel-shaped core pin when such pin is withdrawn from such body 211.

Black, opaque rings 221 are applied on the outside of the wall 219 using a roll marker and a known hot stamping process. Such rings 221 are positioned so that the length of the vial 210 is visually divided into three portions of about equal length.

FIG. 1 shows an exemplary builder's level 11 which incorporates the new vials 10 while FIGS. 2 and 3 show the new vial 10 in cross-section. A comparison of the wall thickness of the vial of FIG. 14 and the dramatically-greater thickness of the wall 13 of the new vial 10 of FIGS. 2 and 3 demonstrate why the new vial 10 is much more breakage-resistant. Builders who choose a level 11 like that of FIG. 1 which is made using the new vial 10 will experience substantially reduced vial breakage and improved productivity.

Figure 4:
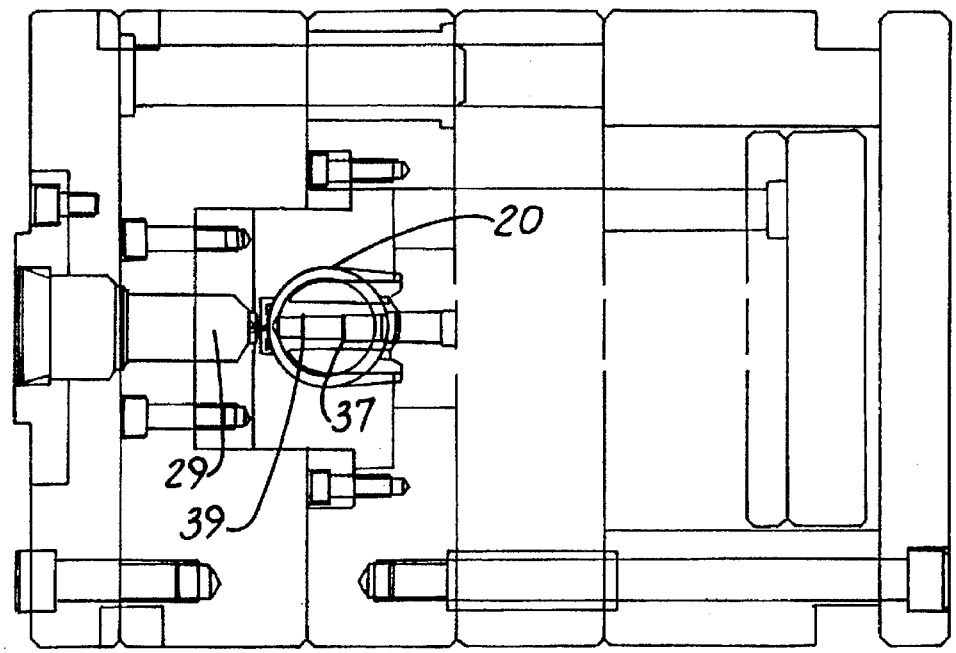
FIG. 4 is a view of a mold closed for making an intermediate vial product.
Figure 5:
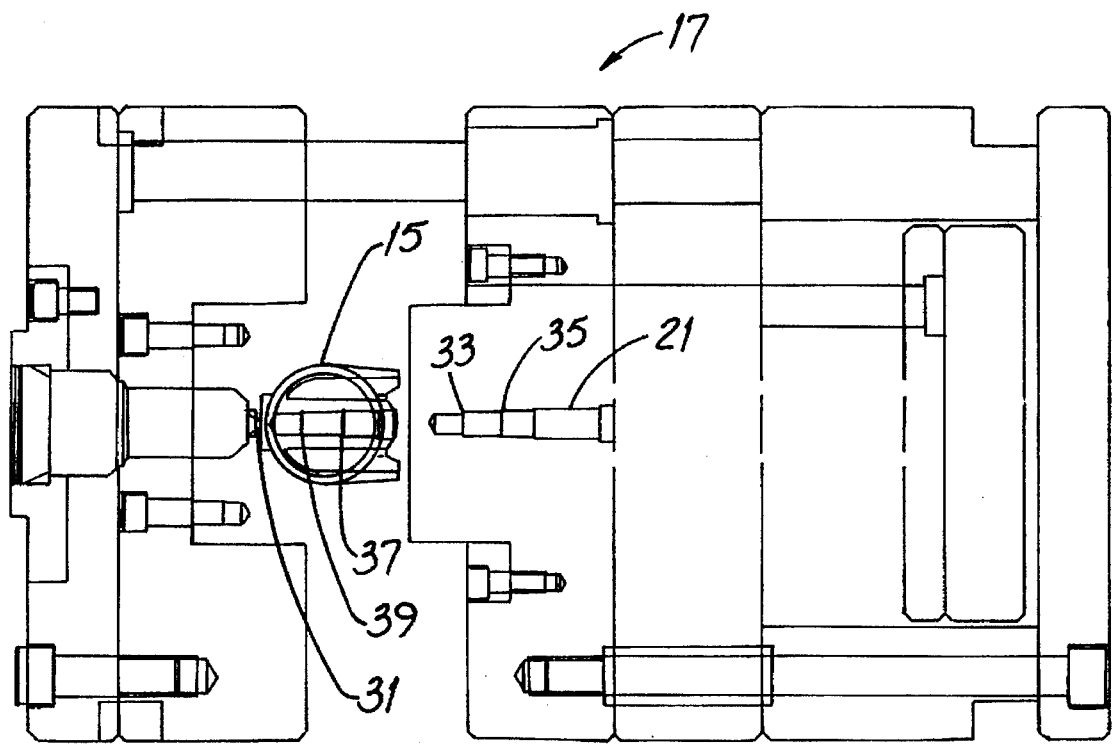
FIG. 5 is a view of the mold and intermediate vial product of FIG. 4 shown with the mold open.
Figure 6:
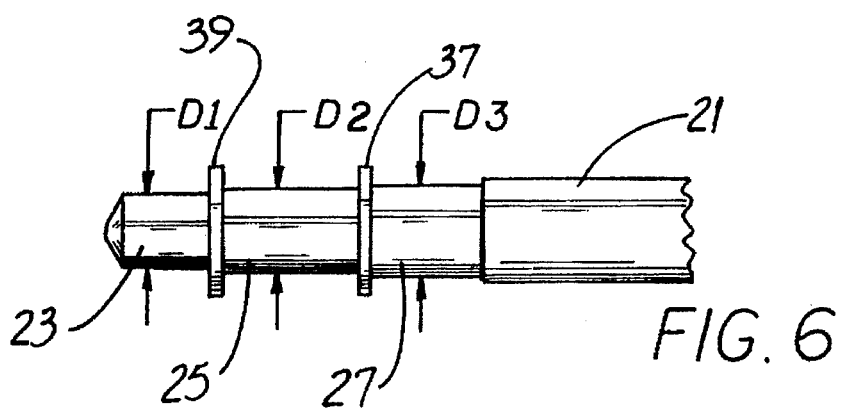
FIG. 6 is an elevation view of a core pin and marker rings used to make the intermediate vial product. Parts are broken away.

Aspects of the new intermediate vial product 15, of the new method for making a vial 10 and of the new level vial 10 will now be described. Referring also to FIGS. 4, 5 and 6, a mold 17 for making the new intermediate vial product 15 has a cavity 20 which defines the outer shape of such product 15. A core pin 21 is positioned in the cavity 20 and has first, second and third pin sections 23, 25 and 27, respectively. Each section 23, 25, 27 is generally cylindrical and such sections 23, 25, 27 have diameters D1, D2 and D3, respectively, which progressively increase.

When the mold 17 is closed as shown in FIG. 4, viscous plastic is injected through a hot sprue bushing 29 into the cavity 20 and around the core pin 21. In so doing, an end closure 31 is integrally molded with the product 15.

Referring particularly to FIGS. 5 and 6, the first and second sections 23, 25 abut at a first shoulder 33 and the second and third sections 25, 27 abut at a second shoulder 35. Before molding the vial product 15, marker rings 37 and 39 are fitted on the second and first sections 25, 23, respectively (in that order) to abut the second and first shoulders 35, 33, respectively.

Figure 8:
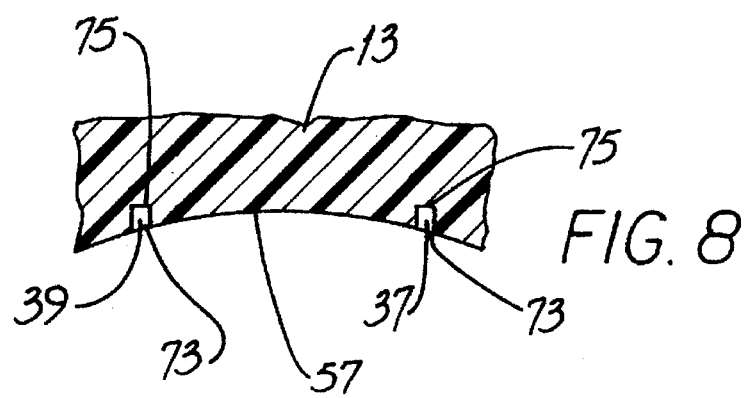
FIG. 8 is a section view of the wall and marker rings of the new vial. Parts are broken away.
Figure 7:
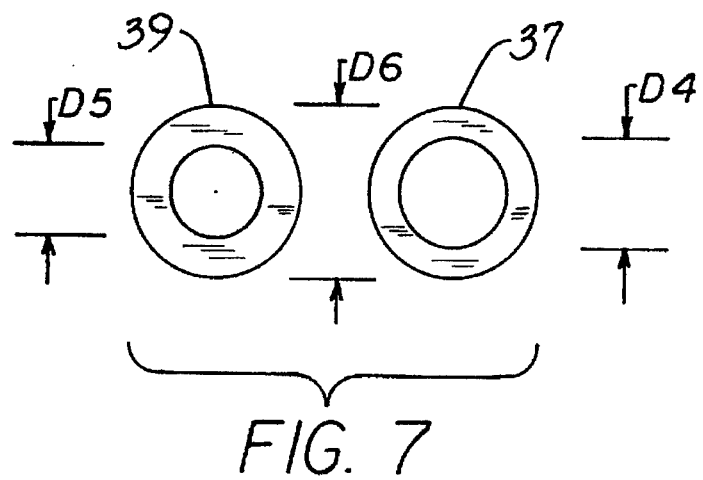
FIG. 7 is an elevation view of the marker rings of the type mounted on the core pin of FIG. 6.

Referring particularly to FIG. 7, such marker rings 37, 39 have inside diameters D4, D5 generally corresponding to the diameters D2, D1 of the second and first sections 25, 23, respectively. But while their inside diameters D4, D5 differ, their outside diameters D6 are essentially the same. And as shown in FIGS. 2, 3 and 8, such outside diameters D6 are selected to be sufficiently great that a portion of each marker ring 37, 39 remains embedded in the wall 13 of the vial 10 after wall machining is finished.

It is to be appreciated that before and after machining, each of the marker rings 37, 39 entirely circumscribes the pin 21 and entirely circumscribes the interior cavity 43 of the intermediate vial product 15 and of the finished level vial 10. In other words, there are no discontinuities in such rings 37, 39.

Referring also to FIGS. 9 and 10, the intermediate vial product 15 includes generally-cylindrical first and second cavity portions 45 and 47, respectively. Such portions 45, 47 have, respectively, first and second radially-measured dimensions, e.g., diameters D1' and D2'. In one specific embodiment, the second diameter D2' is greater than the first diameter D1'. The product also has a generally cylindrical third cavity portion with a third diameter D3' greater than either the first diameter D1' or the second diameter D2'.

The first and second cavity portions 45, 47 abut at a first boundary 51 and the product 15 includes a first marker ring 39 at the boundary 51. Similarly, the third cavity portion 49 and the second cavity portion 47 abut at a second boundary 53 and the product 15 includes a second marker ring 37 at the second boundary 53.

Referring also to FIGS. 8, 11, 12 and 13, a new method for making a level vial 10 includes the steps of providing an intermediate vial product 15 with a wall 13 having at least one marker ring 37 or 39 embedded in it. The wall 13 and the ring 37 or 39 are machined to form a wall surface 57 that is free of discontinuities and smooth. The bubble 59 in the vial 10 is thereby free to move smoothly along the wall 13 and across the ring 37 or 39.

In more specific aspects, the providing step includes supporting the marker ring 37 or 39 within a mold cavity 20 by mounting the marker ring 37 or 39 on a pin 21 and then filling the mold 17 with hot plastic material. After filling the mold 17, the plastic material is permitted to cool so that such material and the marker ring 37 or 39 bond to one another for subsequent machining.

Figure 13:
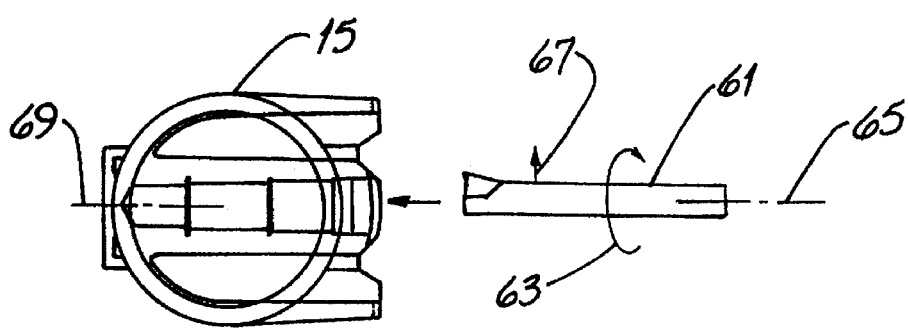
FIG. 13 is a side elevation view of the intermediate vial product shown in conjunction with a cutting tool used to machine the inside cavity of such product.

Referring particularly to FIG. 13, the machining step includes providing a cutting tool 61 and relatively rotating the intermediate vial product 15 and the cutting tool 61 with respect to one another. Most preferably, the intermediate vial product 15 is held stationary and as indicated by the arrow 63, the cutting tool 61 is rotated with respect to such product 15.

More specifically, the cutting tool 61 is rotated about an axis of rotation 65 and as indicated by the arrow 67, is also moved away from the central long axis 69 of the intermediate product 15, i.e., the tool 61 is moved radially outward. Most preferably, a pointed tool 61, a type of boring bar, is used for machining and the moving step also includes moving the cutting tool 61 along the interior cavity 43 of the intermediate product 15.

Referring particularly to FIGS. 2, 3 and 8, the new level vial 10 includes (a) a body 41 with an interior wall surface 57 defining a body cavity 71, (b) a marker ring 37, 39 exposed in the cavity 71, and (c) a bubble 59 in the cavity 71. The interior wall surface 57 and the marker ring 37, 39 each have a machined, slightly-curvilinear surface 57, 73, respectively, and the surfaces 57, 73 are coextensive with one another. There are no significant grooves or edges on which the vial bubble 59 might otherwise "hang up"—such bubble 59 moves smoothly across the machined surfaces 57, 73.

The body 41 is molded of plastic and the marker ring 37, 39 and the plastic body 41 are bonded to one another. And the marker ring 37, 39 has an outer perimeter surface 75 which is spaced radially outwardly from the interior surface 57 and is free of discontinuities. (It is to be appreciated that even though the new vial 10 has a relatively-thick wall, there is substantially no parallax problem as would otherwise be the case in a thick-wall vial having marker rings 37, 39 on the exterior of the vial body.)

Preferred materials for the vial body 41 include transparent thermoplastics and, most preferably, acrylic. Preferred materials for the marker rings 37, 39 include a thermoset material, metal, ceramic, a thermoplastic material having a melting temperature substantially higher than the melting temperature of the body plastic or some other material that may be machined by the tool 61.

Most preferably, such rings 37, 39 are thermoset phenolic which may be readily stamped out of sheet stock. All of such materials have rigidity (even at a temperature of about 420° F., i.e., the approximate temperature of plastic acrylic being injected into the mold cavity 20) to withstand significant deformation during injection.

As used herein and as commonly used in the plastic industry, a "thermoset" material is a material which, once cooled to a solid phase, cannot be re-converted to a liquid phase by the addition of heat. A "thermoplastic" material is one which may be changed between a viscous liquid and a solid phase by the addition or removal of heat.

While the principles of the invention have been shown and described in connection with a few specific embodiments, it is to be understood clearly that such embodiments are exemplary and not limiting. For example, the core pin 21 mentioned above is described as having three cylindrical sections 23, 25, 27 of progressively-increasing diameter and "shoulders" 33, 35 at the section junctions to hold marker rings 37, 39 in place during molding.

It should be appreciated that sections 23, 25, 27 may have other cross-sectional shapes. A preferred shape is ovoid and other such shapes includes square or, in fact, virtually any other geometric shape.

Another approach would be to use a tapered core pin 21 and marker ring inside diameters D4, D5 selected to secure such rings 37, 39 reasonably firmly at a particular location along the length of the core pin 21. While this version would be attended by some manufacturing problems avoided by the more preferred embodiment, such version is feasible and contemplated by the invention.

What is claimed:

1. In a level vial including (a) a body with an interior wall defining a body cavity, (b) a marker ring exposed in the cavity, and (c) a bubble in the cavity, the improvement wherein:

the interior wall has a machined surface;

the marker ring has a machined surface; and the surfaces are coextensive with one another, whereby the bubble moves smoothly across the machined surfaces.

2. The vial of claim 1 wherein the surfaces are curvilinear.

3. The vial of claim 2 wherein the body is made of plastic and the marker ring and the body are bonded to one another.

4. The vial of claim 1 wherein the marker ring has a perimeter surface spaced from the interior wall and such perimeter surface is free of discontinuities.

5. The vial of claim 4 wherein the body is molded of plastic and includes an end closure portion integrally molded with the body.

6. The vial of claim 1 wherein the body is made of plastic having a melting temperature and the marker ring is made of a material selected from a group of materials including (a) a thermoset material, (b) metal, and (c) a thermoplastic material having a melting temperature substantially higher than the melting temperature of the body plastic.

7. An intermediate vial product for making a level vial by machining such product, the product having a long axis and, prior to machining, the product further includes:

a first cavity portion having a first dimension measured perpendicular to the axis;

a second cavity portion abutting the first cavity portion at a boundary and having a second dimension measured perpendicular to the axis and being greater than the first dimension; and a marker ring at the boundary.

8. The product of claim 7 including a third cavity portion having a third dimension measured perpendicular to the axis, such third dimension being greater than the first dimension.

9. The product of claim 8 wherein the third dimension is greater than the second dimension.

10. The product of claim 9 wherein the cavity portions are generally cylindrical and the dimensions are diameters.

11. The product of claim 8 wherein the first, second and third cavity portions are generally cylindrical.

12. The product of claim 7 wherein:

the boundary is a first boundary and the marker ring is a first marker ring;

the product includes a third cavity portion;

the third cavity portion and the second cavity portion abut at a second boundary; and the product includes a second marker ring at the second boundary.

13. A method for making a level vial including the steps of:

providing an intermediate vial product with a body wall having at least one marker ring embedded therein; and machining the wall and the ring to form a wall surface free of discontinuities, whereby a bubble in the vial is free to move smoothly along the wall and across the ring.

14. The method of claim 13 wherein the providing step includes:

supporting the marker ring within a mold; and filling the mold with hot plastic material.

15. The method of claim 14 wherein the supporting step includes mounting the marker ring on a pin.

16. The method of claim 15 wherein the filling step is followed by the step of permitting the plastic material to cool, thereby bonding the plastic material and the marker ring to one another.

17. The method of claim 13 wherein the machining step includes:

providing a cutting tool; and relatively rotating the intermediate vial product and the cutting tool with respect to one another.

18. The method of claim 17 wherein the cutting tool is rotated with respect to the intermediate vial product.

19. The method of claim 13 wherein the intermediate vial product has a central long axis and the machining step includes:

providing a cutting tool:

rotating the cutting tool about an axis of rotation; and moving the cutting tool away from the central long axis.

20. The method of claim 19 wherein the intermediate vial product has an interior cavity and the moving step also includes moving the cutting tool along the cavity.

* * * * *